US008296131B2

(12) United States Patent
Shallom et al.

(10) Patent No.: US 8,296,131 B2
(45) Date of Patent: Oct. 23, 2012

(54) METHOD AND APPARATUS OF PROVIDING A QUALITY MEASURE FOR AN OUTPUT VOICE SIGNAL GENERATED TO REPRODUCE AN INPUT VOICE SIGNAL

(75) Inventors: Ilan D. Shallom, Ashdod (IL); Nitay Shiran, Moshav Meishar (IL)

(73) Assignee: AudioCodes Ltd., Lod (IL)

( * ) Notice: Subject to any disclaimer, the term of this patent is extended or adjusted under 35 U.S.C. 154(b) by 852 days.

(21) Appl. No.: 12/345,685

(22) Filed: Dec. 30, 2008

(65) Prior Publication Data

US 2010/0169079 A1 Jul. 1, 2010

(51) Int. Cl.
*G10L 19/00* (2006.01)
*G10L 15/06* (2006.01)

(52) U.S. Cl. ...................... 704/200.1; 704/218; 704/241

(58) Field of Classification Search ........................ None
See application file for complete search history.

(56) References Cited

U.S. PATENT DOCUMENTS

| | | | | |
|---|---|---|---|---|
| 7,313,517 | B2 * | 12/2007 | Beerends et al. | 704/200 |
| 7,412,375 | B2 * | 8/2008 | Goldstein et al. | 704/200.1 |
| 2003/0219087 | A1 * | 11/2003 | Boland | 375/371 |
| 2004/0002852 | A1 * | 1/2004 | Kim | 704/205 |
| 2004/0186731 | A1 * | 9/2004 | Takahashi et al. | 704/277 |

OTHER PUBLICATIONS

Li et al. "Perceptual Evaluation of Pronunciation Quality for Computer Assisted Language Learning". Technologies for E-Learning and Digital Entertainment, Lecture Notes in Computer Science, Edutainment 2006, vol. 3942, pp. 17-26.*

Myers et al. "A Level Building Dynamic Time Warping Algorithm for Connected Word Recognition". IEEE Transactions on Acoustics, Speech, and Signal Processing, vol. 29, No. 2, 1981, pp. 284-297.*

Ney, Hermann. "The Use of a One-Stage Dynamic Programming Algorithm for Connected Word Recognition". IEEE Transactions on Acoustics, Speech, and Signal Processing, vol. ASSP-32, No. 2, Apr. 1984, pp. 263-271.*

Considerations in Dynamic Time Warping Algorithms for Discrete Word Recognition, Lawrence R Rabiner et al, IEEE Transactions on Acoustics, Speech, and Signal processing, Vol, ASSP-26, No. 6, Dec. 1978.

Dynamic programming Algorithm Optimization for Spoken Word Recognition, Hiroaki Sakoe and Seibi Chiba, IEEE Transactions on Acoustics, Speech, and Signal processing, vol. ASSP-26, No. 1, Feb. 1978.

Enhanced Time Alignment Integrated Within the PESQ, Audiocodes, Jul. 2008.

Revisited Suggested PESQ results ITU-T Sup.23 GIPS data, Speech Signal Processing lab Electrical and Computer Engineering, Ben-Gurion University, Israel, Apr. 2008.

Measuring Voice Quality, Global IP Sound, California, USA, Dec. 2006.

(Continued)

*Primary Examiner* — Jesse Pullias
(74) *Attorney, Agent, or Firm* — Eitan, Mehulal & Sadot

(57) ABSTRACT

A method of providing a quality measure for an output voice signal generated to reproduce an input voice signal, the method comprising: partitioning the input and output signals into frames; for each frame of the input signal, determining a disturbance relative to each of a plurality of frames of the output signal; determining a subset of the determined disturbances comprising one disturbance for each input frame such that a sum of the disturbances in the subset set is a minimum; and using the set of disturbances to provide the measure of quality.

18 Claims, 7 Drawing Sheets

OTHER PUBLICATIONS

Series P: telephone transmission Quality, Telephone Installations, Local Line Networks: Methods for Objective and Subjective Assessment of Quality ITU-T P862, Feb. 2001.

A Perceptual Speech-Quality Measure Based on a Psychoacoustic Sound Representation, PTT research, 2260 AK, Leidschendam, The Netherlands. John G Beerends, AES member, and Jan A. Stemerdink, J Audio Eng Soc., vol. 42, No. 3, Mar. 1994.

A Perceptual Audio-Quality Measure Based on a Psychoacoustic Sound Representation, PTT research, 2260 AK, Leidschendam, The Netherlands. John G Beerends, AES member, and Jan A. Stemerdink, J Audio Eng Soc., vol. 40, No. 12, Dec. 1992.

Modified PESQ algorithm PDR: Time Alignment using DTW, Instructors: Prof. Dov Wulich; Dr Ilan Shallom; written by: Nitay Shiran. Speech Signal Processing lab Electrical and Computer Engineering, Ben-Gurion University, Israel, Jan. 2008.

Enhanced PESQ algorithm for objective assessment of speech quality in communication systems, by: Nitay Shiran; Supervisors: Prof. Dov Wulich, Dr. Ilan Shallom AudioCodes and Ben-Gurion University, Israel, Jun. 2008.

* cited by examiner

METHOD AND APPARATUS OF PROVIDING A QUALITY MEASURE FOR AN OUTPUT VOICE SIGNAL GENERATED TO REPRODUCE AN INPUT VOICE SIGNAL

FIELD

Embodiments of the invention relate to testing quality with which a device that processes an audio signal reproduces the audio signal.

BACKGROUND

Many different types of telephony technologies and devices are presently available and in use for processing, storing, and transmitting audio streams, and in particular voice streams, and new telephony technologies and devices are constantly being developed and introduced into the market. These technologies and devices span a gamut that includes plain old telephony systems (POTS) and devices, voice over IP (VOIP), voice over ATM, voice over mobile (e.g. GSM, UMTS), and various speech coding technologies and devices. For convenience of presentation, any technology and/or device, such as by way of example, a technology or device noted above, that provides a reproduction of a voice signal, is generically referred to as a "CODEC".

Testing CODECs to determine quality of speech that they provide and if the quality is acceptable, was, and often still is, determined by having human subjects listen to, and grade, voice signals that the CODECs produce. An advantage of using human subjects to test and grade a CODEC is that humans provide a measure of quality of voice reproduction that is perceived by the consumers who use the CODEC. The measures they provide reflect the human auditory-brain system and are responsive to features of sound to which the human auditory-brain system is sensitive and to how sound is perceived by humans. Quality grades for CODEC voice reproduction signals perceived by human subjects has been standardized in a Mean Opinion Score (MOS), which ranks perceived quality of voice reproduction in a scale of from 1 to 5, with 5 being a best perceived quality.

However, using human subjects to grade CODEC sound quality is generally expensive, time consuming, not easily used in many venues, difficult to arrange and often not reproducible. A method referred to as "Perceptual Evaluation of Speech Quality (PESQ)" provides an "objective" method of grading quality of voice reproductions provided by a CODEC and is presently a standard for measuring voice reproduction quality. PESQ is configured to generate a voice quality score for a reproduced vocal signal that is indicative of, and generally correlates highly with, a quality score that would be perceived for the voice signal by human subjects. PESQ is described in ITU-T Recommendation P.862, the disclosure of which is incorporated herein by reference, and was adopted as a standard by the ITU-T for assessing speech quality for CODECs in February of 2001.

In accordance with PESQ, a CODEC is graded for quality of voice signal reproductions that it provides by comparing an input voice signal that it receives with a reproduction, output voice signal that the CODEC outputs responsive to the input. To make the comparison, the input and output voice signals are processed to provide input and output psychophysical "perceptual" representations of the signals. The perceptual representations, hereinafter "perceptual signals", are representative of the way in which the input and output signals are perceived by the human auditory system. The perceptual signals are a frame-by-frame mapping of the frequencies and loudness of the input and output signals onto frequency and loudness scales that reflect sensitivity of the human auditory system.

Typically, the perceptual signals are generated by performing a windowed, frame by frame, fast Fourier transform (FFT) of the signals to provide a frequency spectrum for each frame of the signals. The frequency spectra are warped to the human perceptual frequency and loudness scales measured in barks and sones respectively to provide for each frame, in the input and output perceptual signals, loudness in sones as a function, hereinafter referred to as a sone density function", of frequency in barks. The input signal and output signal are each therefore represented by a two dimensional "perceptual" array of sone values as a function of frame number and frequency. A typical frame is a 32 ms long period with 50% overlap of PCM samples acquired at a sampling rate of 8 kHz or 16 kHz and windowing is defined by a multiplication of each frame with Hanning window 32 ms long.

Signed differences between the sone density functions of corresponding frames in the perceptual input and output signals are determined to provide a frame-by-frame "audible perceptual difference" between the original, input signal and the output signal as a function of bark frequency. The perceptual differences are adjusted for masking to define a "disturbance" function of bark frequency for each frame, which function is conventionally referred to as a "disturbance density function" of the frame.

The disturbance density functions for a given pair of corresponding input and output signal frames is particularly sensitive to temporal misalignment between the frames. An article entitled "Perceptual Evaluation of Speech Quality (PESQ), the new ITU standard for end-to-end speech quality assessment. Part I—Time alignment" by A. w. Rix, et al; J. Audio Eng. Soc.; Vol. 50, No. 10; October 2002 pp 754-764; Part II—Psychoacoustic model. JAES Volume 50 Issue 10 pp. 765-778; October 2002, the disclosures of which is incorporated herein by reference, notes that PESQ values are very sensitive to temporal frame misalignment by even small fractions of a frame length. As a result, prior to calculating disturbances and disturbance density functions, PESQ performs a relatively elaborate procedure for determining relative delays between corresponding input and output signal frames and time aligning the frames.

Conventionally PESQ assumes that delays are piecewise constant i.e. that a delay for a given section, generally comprising a plurality of frames, of the output signal relative to a corresponding section of the input signal, is constant for all frames in the output section. The section delay is determined responsive to cross correlating a portion of the output signal that comprises the section and/or the section with, respectively, a portion of the input signal that comprises the corresponding section and/or the corresponding section of the input signal.

The disturbance density function for a frame is processed in accordance with a metric defined by a cognitive model that models human sensitivity to disturbances to calculate a disturbance and an asymmetric disturbance for each frame. The frame disturbances and asymmetric frame disturbances are processed in accordance with the cognitive model to provide an "objective" PESQ measure of perceived quality, typically in MOS units, of the output signal.

SUMMARY

An aspect of some embodiments of the invention relates to providing an improved method for providing a test of quality for an output voice signal that a CODEC generates responsive to an input voice signal that the CODEC receives.

An aspect of some embodiments of the invention relates to providing an improved method of temporally aligning frames in the output signal provided by the CODEC to frames in the input signal.

An aspect of some embodiments of the invention, relates to providing magnitudes of time delays for frames in the output signal responsive to magnitudes of disturbances between frames in the input and output signals.

According to an aspect of some embodiments of the invention, magnitudes of time delays are determined responsive to minimizing a sum of disturbances between a sequence of frames in the input signal and a corresponding sequence of frames in the output signal.

In accordance with an embodiment of the invention, to determine the delays for frames in the output sequence, disturbances are determined for each frame in the corresponding input sequence and each of a plurality of frames in the output sequence. Optionally, a disturbance for a given input frame and a given output frame is determined in accordance with a metric defined by the cognitive model comprised in PESQ. Each input frame in the input sequence is then paired to an output frame in the output sequence so that a sum of the disturbances for the paired frames is minimized. A temporal displacement of a frame in the output sequence relative to its paired input sequence frame defines the time delay for the output sequence frame and magnitude of the time delay. For convenience of presentation, a time delay determined responsive to minimizing a sum of disturbances in accordance with an embodiment of the invention is referred to as a "warped" time delay.

In accordance with an embodiment of the invention, pair matching to minimize a sum of disturbances is performed using a dynamic programming algorithm in which a recurrence relation for a sum of the disturbances is repeatedly iterated. If "i" is an index indicating an i-th frame of the input sequence and I is a total number of frames in the input sequence the recurrence relation is optionally iterated I times, from i=1 to i=I to pair frames.

In accordance with an embodiment of the invention, a number of output frame candidates for pairing with a given i-th input frame is limited by temporal constraints to preserve causality. Optionally, the constraints limit time delays to magnitudes that are less than those required by causality.

According to an embodiment of the invention, disturbances for the pairs of input and output frames are used to determine quality of the output signal. Optionally, a measure of quality is determined in accordance with the cognitive model comprised in PESQ.

There is therefore provided in accordance with an embodiment of the invention, method of providing a quality measure for an output voice signal generated to reproduce an input voice signal, the method comprising: partitioning the input and output signals into frames; for each frame of the input signal, determining a disturbance relative to each of a plurality of frames of the output signal; determining a subset of the determined disturbances comprising one disturbance for each input frame such that a sum of the disturbances in the subset set is a minimum; and using the set of disturbances to provide the measure of quality. Optionally, the disturbances comprise asymmetric disturbances.

Additionally or alternatively the method optionally comprises limiting choices of disturbances for inclusion in the subset by a constraint. Optionally, if a disturbance for an i-th frame in the input signal relative to a j-th frame in the output signal is represented by $D_{i,j(i)}$ then if $D_{i,j(i)}$ and $D_{i-1,j(i-1)}$ are included in the subset of disturbances, comprising requiring that the disturbances satisfy a constraint: $0 \leqq [j(i)-j(i-1)] \leqq 2$. Optionally, if $[j(i)-j(i-1)]=0$ then $1 \leqq [j(i)-j(i-2)] \leqq 2$.

In some embodiments of the invention, if a given disturbance in the subset of disturbances is greater than a predetermined threshold, at least one frame in each of the input and output signals in a vicinity of the input and output frames used to determine the given disturbance are replaced with frames that define a number of new disturbances greater than the number determined by the at least one frame in each of the input and output signals. Optionally, the method comprises determining an alternative disturbance for the given disturbance responsive to the new disturbances. Optionally, the method comprises replacing the given disturbance with the alternative disturbance if the alternative disturbance is less than the given disturbance. Additionally or alternatively, determining the alternative disturbance optionally comprises using a dynamic programming algorithm.

In some embodiments of the invention, the method comprises temporally aligning frames in the output signal with frames in the input signal responsive to a correlation of energy envelopes of the input and output signals.

In some embodiments of the invention, determining the subset of disturbances comprises using a dynamic programming algorithm.

There is further provided in accordance with an embodiment of the invention, apparatus for testing quality of speech provided by a CODEC the apparatus comprising: an input port for receiving an input audio signal received by the CODEC; an input port for receiving an output audio signal provided by the CODEC responsive to the input signal; and a processor configured to process the input and output signals in accordance with a method of the invention to provide a measure of quality of the output signal.

There is further provided in accordance with an embodiment of the invention, a computer readable storage medium containing a set of instructions for testing quality of an output signal provided by a CODEC responsive to an input signal, the instructions comprising: instructions for partitioning the input and output signals into frames; instructions for determining for each frame of the input signal, a disturbance relative to each of a plurality of frames of the output signal; instructions for determining a subset of the determined disturbances comprising one disturbance for each input frame such that a sum of the disturbances in the subset set is a minimum; and instructions for providing a measure of quality responsive to the disturbances.

BRIEF DESCRIPTION OF FIGURES

Non-limiting examples of embodiments of the invention are described below with reference to figures attached hereto that are listed following this paragraph. Identical structures, elements, or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1A:
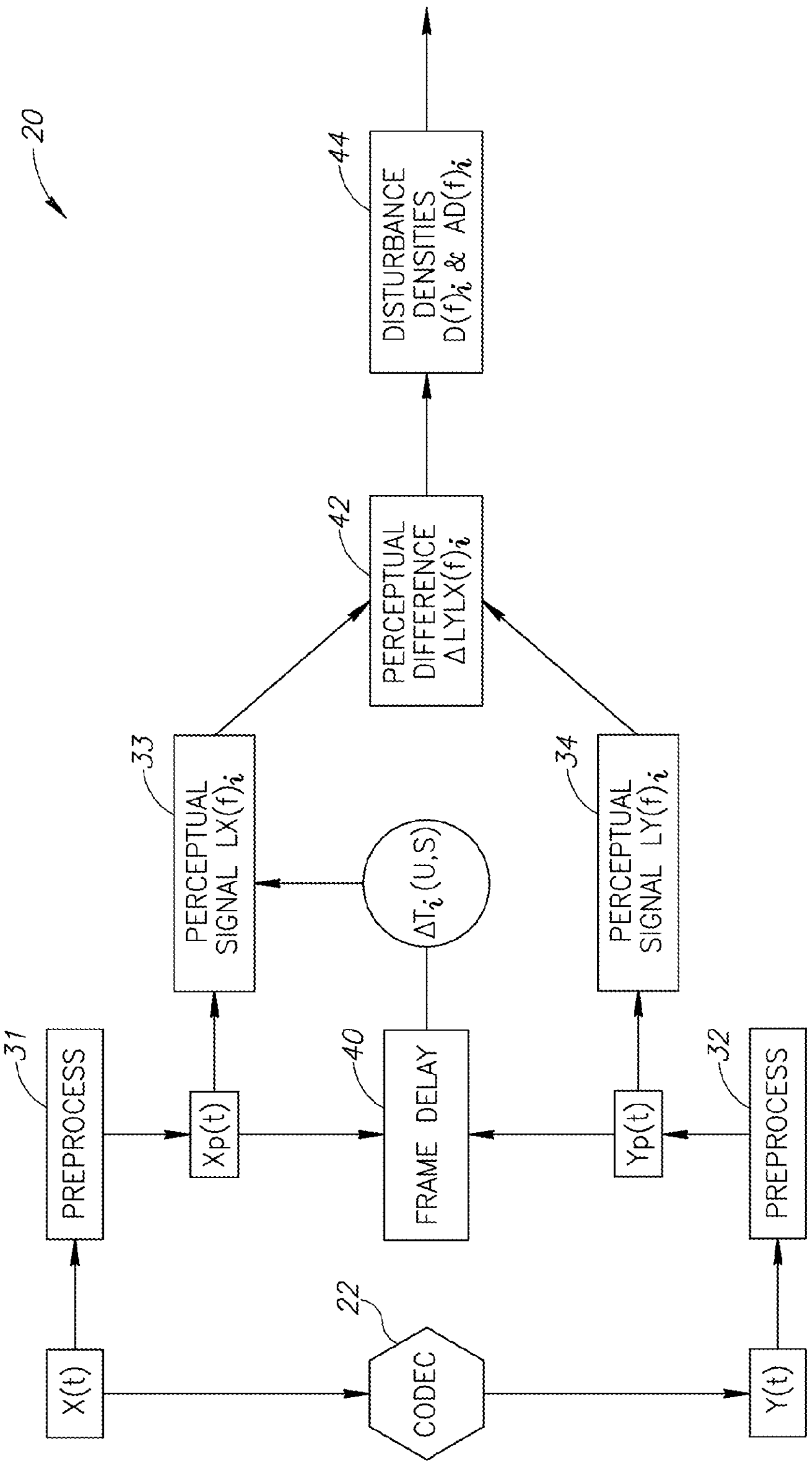
FIG.1A PRIOR ART
FIGS. 1A and 1B show a schematic flow diagram of PESQ being applied to determine quality of speech provided by a CODEC, in accordance with prior art.
Figure 1B:
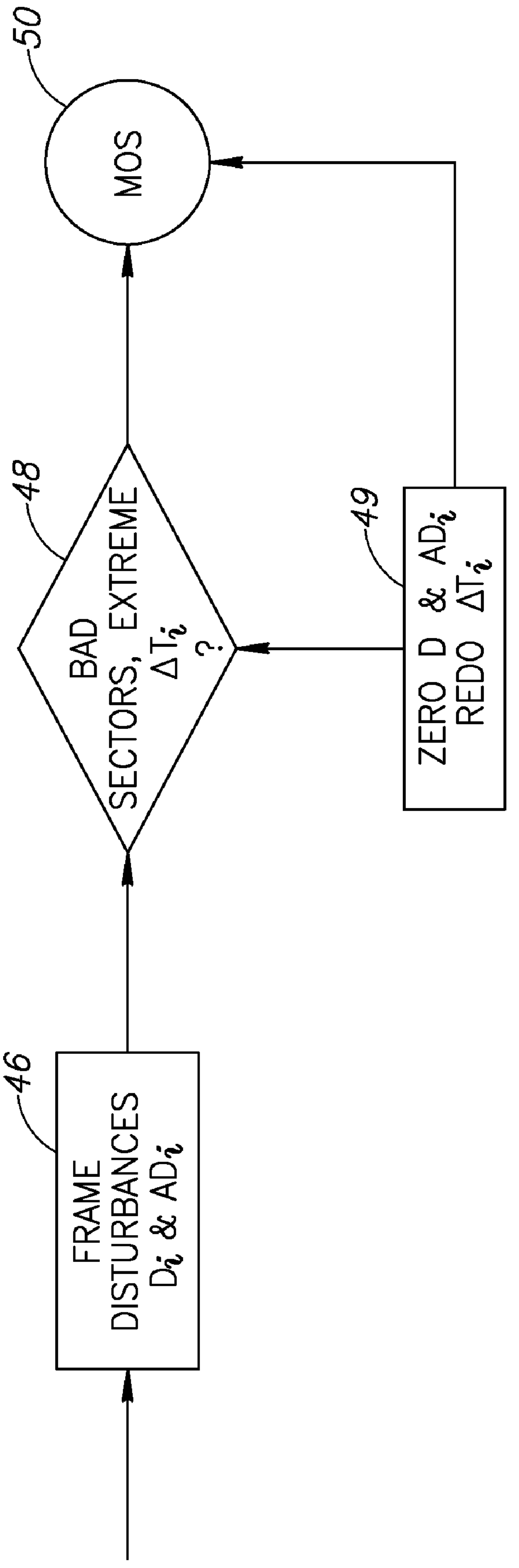
FIG.1B PRIOR ART

FIGS. 1A and 1B show a schematic flow diagram 20 of PESQ, hereinafter also "PESQ 20", being applied to determine quality of speech provided by a CODEC 22, in accordance with prior art. PESQ 20 is shown comparing an original voice signal X(t) which is input to CODEC 22 to a reproduction, Y(t) of input X(t), which the codec outputs in response to the input X(t).

Signals X(t) and Y(t) are preprocessed in blocks 31 and 32 respectively to provide preprocessed signals $X_p(t)$ and $Y_p(t)$. Signals X(t) and Y(t) are assumed to be signals sampled, usually at a rate of 8 kHz or 16 kHz, and preprocessing in PESQ 20 comprises filtering so that the preprocessed signals are limited to a bandwidth of between about 250 Hz to about 4000. The signals are also filtered to simulate frequency transmission characteristics of a telephone handset, typically modeled as a Modified Intermediate Reference System (IRS) and are then scaled to a same intensity. Details of the preprocessing and scaling are given in PESQ ITU-T Recommendation P.862.

Preprocessed signals $X_p(t)$ and $Y_p(t)$ are time aligned in a block 40 to provide a delay $\Delta T_i$ by which an i-th frame of $Y_p(t)$ is shifted in time with respect to a corresponding i-th frame of $X_p(t)$. A quality MOS score provided by conventional PESQ 20 for CODEC 22 is sensitive to temporal displacements of corresponding portions of input and output signals $X_p(t)$ and $Y_p(t)$ relative to each other because the score is provided responsive to differences between functions of the signals. As noted in the article "Perceptual Evaluation of Speech Quality (PESQ), the new ITU standard for end-to-end speech quality assessment. Part I—Time alignment" referenced above, a PESQ quality score can be very sensitive to temporal frame misalignment by even small fractions of a frame length. Time alignment in accordance with PESQ 20 is described below with reference to FIG. 2.

In blocks 33 and 34, the time dependent preprocessed signals $X_p(t)$ and $Y_p(t)$ are fast Fourier transformed (FFT) using a Hann window having a length of 32 ms and overlap of 50% for adjacent frames to provide spectra for frames of the signal. The resultant frequency spectra are warped to produce sone density functions $LX(f)_i$ and $LY(f)_i$, where the subscript "i" indicates an i-th frame to which the sone density function belongs. Sone density functions $LX(f)_i$ and $LY(f)_i$ are functions that respectively define loudness for frames of input and output signals $X_p(t)$ and $Y_p(t)$ in sone units as functions of frequency in barks. A loudness density function corresponding to a voice signal is a perceptual signal that mimics the way in which the human auditory system represents the voice signal.

In a block 42, perceptual signals $LX(f)_i$ and $LY(f)_i$ are subtracted to provide for each frame "i" a signed perceptual difference function "$\Delta LYLX(f)_i$"=$[LY(f)_i-LX(f)_i]$. In a block 46 (FIG. 1B), $\Delta LY\text{-}LX(f)_i$ is processed to provide a frame disturbance density function, "$D(f)_i$" as a function of frequency in bark for each frame i, and an asymmetric frame disturbance density function "$AD(f)_i$" for the frame. $D(f)_i$ is calculated by processing $\Delta LYLX(f)_i$ to account for masking. $AD(f)_i$ is calculated by processing $D(f)_i$ to emphasize disturbances that CODEC 22 generates by adding frequency components to input signal X(t). Details for calculating $D(f)_i$ and $AD(f)_i$ are provided in ITU-T PESQ Recommendation P.862.

In a block 46 a frame disturbance $D_i$ and an asymmetric frame disturbance $AD_i$ are calculated for each frame. The frame disturbance $D_i$ is a weighted, L3 or L2 norm sum of $D(f)_i$ over bark frequencies f. The asymmetric frame disturbance $AD_i$ is a weighted L1 norm sum of $D(f)_i$ over bark frequencies f.

In a decision block 48, frame disturbances $D(f)_i$ and $AD(f)_i$ are checked to locate bad sectors and to locate frames for which delays $\Delta T_i$ have been reduced by greater than half a frame length. If there are no bad sector frames nor frames exhibiting extreme changes in delay $\Delta T_i$, PESQ proceeds to a block 50 and uses the frame disturbances $D_i$ and asymmetric disturbances $AD_i$ to provide a MOS score for output signal Y(t). If on the other hand, there are bad sector frames and/or frames exhibiting extreme changes in $\Delta T_i$, PESQ 20 proceeds from block 48 to a block 49. In block 49 PESQ recalculates, frame delays $\Delta T_i$, frame disturbances and asymmetric frame disturbances for bad sector frames and for frames exhibiting extreme delay changes, sets their respective disturbances $D_i$ and asymmetric disturbances $AD_i$ to zero. From block 49 PESQ proceeds to block 50 to provide a PESQ MOS.

Methods of calculating the PESQ MOS score are described ITU-T PESQ recommendation p.862 and involve L6 and L2 aggregations of frame disturbances and asymmetric frame disturbances and a linear combination of the resulting average disturbance and asymmetric disturbance values. The PESQ MOS score has a range from −0.5 to 4.5.

Figure 2:
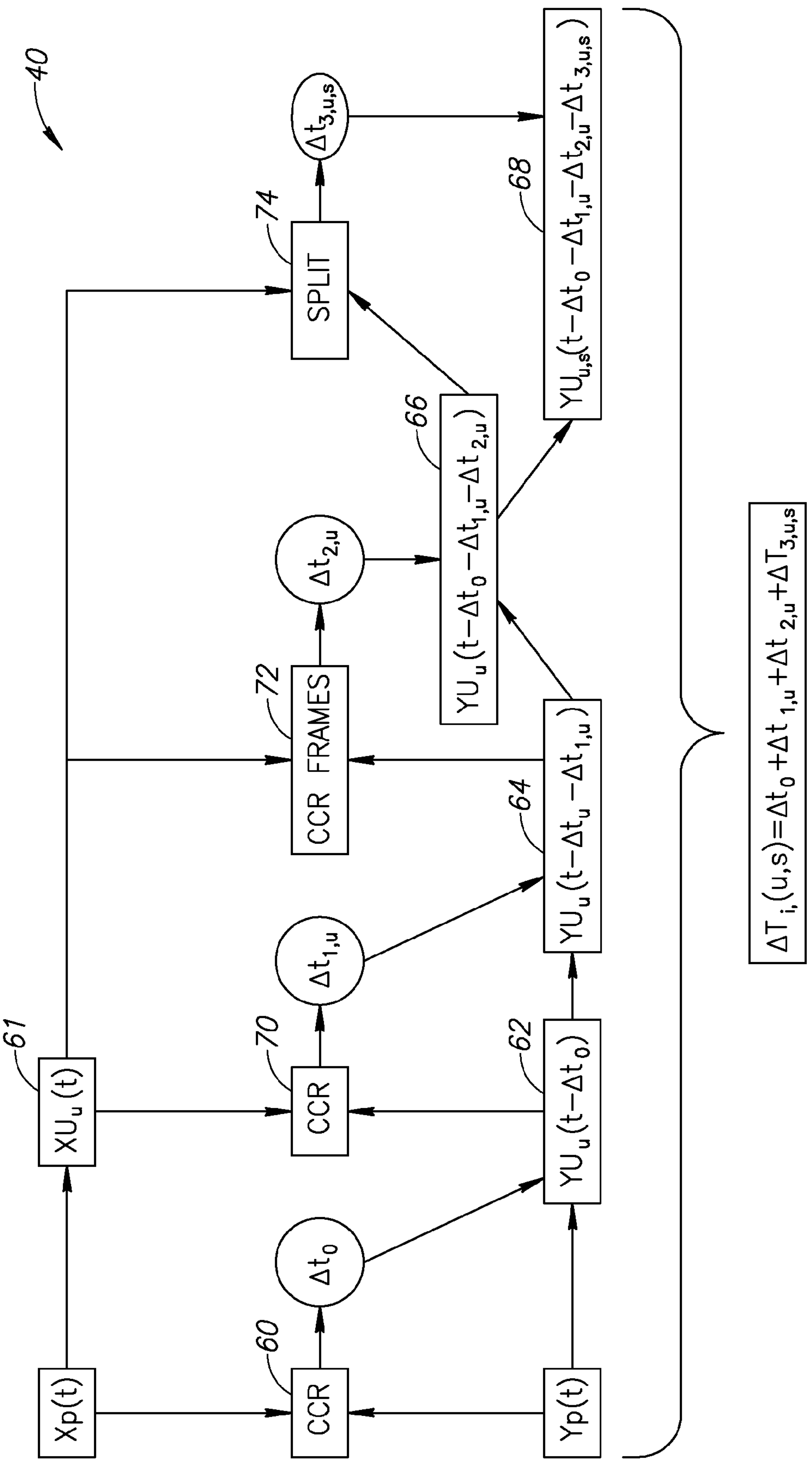
FIG. 2 PRIOR ART
FIG. 2 shows a schematic flow diagram for determining PESQ frame delays in accordance with prior art.

FIG. 2 shows a schematic flow diagram detailing determining frame delays $\Delta T_i$ in block 40 shown in FIG. 1 in accordance with conventional PESQ 20. The numeral 40 is used to indicate the flow diagram in FIG. 2 as well as block 40 in FIG. 1.

In a block 60 preprocessed input and output signals $X_p(t)$ and $Y_p(t)$ are processed to produce an energy envelope for each signal. The energy envelopes are cross-correlated (CCR) to determine a relative time displacement $\Delta t_O$ between the envelopes for which the cross-correlation is maximum. The delay $\Delta t_O$ is considered to be an "overall" temporal displacement by which output signal Y(t) is delayed with respect to input signal X(t) and is input to a block 62 discussed below.

In a block 61 $X_p(t)$ is processed to locate and define utterances. An utterance is a portion of a voice signal comprising active speech, usually identified by a voice activity detector (VAD), generally bounded by periods of silence. PESQ 20 typically defines an utterance as a portion of a voice signal having duration of at least 320 ms and comprising no more than 200 ms of silence. An utterance is generally considered to have start and end times at midpoints of silence periods between its active speech period and active speech periods of immediately preceding and succeeding utterances respectively. A result of processing $X_p(t)$ to identify utterances is represented as a signal $XU_u(t)$ where the subscript "u" indicates a particular "u-th" utterance in the signal. For a given index, u, $XU_u(t)$ defines the time dependence of signal Xp(t) between the start time and end time of the u-th utterance.

Similarly, in 62, $Y_p(t)$ is processed to locate and define utterances. However, as noted above, block 62 also receives the overall delay time $\Delta t_O$, which is used in the block to temporally align utterances in $Y_p(t)$ with utterances in $XU_u(t)$. A signal resulting from processing $Y_p(t)$ in block 62 to locate utterances and time align the located utterances with those of signal $XU_u(t)$, is represented by $YU_u(t-\Delta t_O)$. Corresponding utterances in $XU_u(t)$ and $YU_u(t-\Delta t_O)$ have a same index u and values of $XU_u(t)$ at a given time, t, are assumed to correspond to values of $YU_u(t)$ at time $(t-\Delta t_O)$. (It is noted that $\Delta t_O$, and other time displacements referred to below, can of course be positive or negative and the use of a minus sign before the expression for a time displacement is arbitrary.)

Whereas each utterance in $YU_u(t-\Delta t_O)$ has been delayed by a same $\Delta t_O$, an actual relative delay between corresponding utterances of a given pair of utterances may vary from $\Delta t_O$. Time alignment between signals $XU_u(t)$ and $YU_u(t-\Delta t_O)$ is improved in a block 70. Block 70 receives $XU_u(t)$ and $YU_u(t-\Delta t_O)$, and for each pair of corresponding utterances indicated by a same index u, determines an energy envelope for each of the utterances in the pair, optionally, from the energy envelopes determined in block 60. The envelopes are cross-correlated to provide for the pair of utterances, an utterance "envelope" time delay $\Delta t_{1,u}$, by which the time displacement $\Delta t_O$ is to be adjusted to improve alignment between the utterances. In a block 64, $\Delta t_{1,u}$ is used to adjust time alignment of $YU_u(t-\Delta t_O)$ and provide a signal $YU_u(t-\Delta t_O-\Delta t_{1,u})$ having improved alignment with $XU_u(t)$.

In a block 72, an additional "fine" time alignment is performed to improve time alignment of $YU_u(t-\Delta t_O-\Delta t_{1,u})$ with $XU_u(t)$. Corresponding frames in a same utterance are cross-correlated to determine for each pair of frames, a relative frame temporal displacement. A weighted average of the frame temporal displacements for the utterance is determined to provide a fine time alignment adjustment, $\Delta t_{2,u}$, to $\Delta t_{1,u}$ for the utterance. In a block 66, $\Delta t_{2,u}$ is incorporated in the time alignment of $YU_u(t-\Delta t_O-\Delta t_{1,u})$ to provide a signal $YU_u(t-\Delta t_O-\Delta t_{1,u}-\Delta t_{2,u})$. Details of a method for determining and weighting frame temporal displacements to calculate $\Delta t_{2,u}$ are provided in ITU-T Recommendation P.862.

In a block 74, signals $XU_u(t)$ and $YU_u(t-\Delta t_O-\Delta t_{1,u}-\Delta t_{2,u})$ are processed to further adjust and improve time alignment and account for possible different delays for different sections of a same utterance in $YU_u(t-\Delta t_O-\Delta t_{1,u}-\Delta t_{2,u})$ relative to its corresponding utterance in $XU_u(t)$.

Each utterance in a pair of corresponding utterances is split into two sections so that the two sections of one of the utterances correspond to the two sections of the other utterance. A second, fine delay is then determined for each section by calculating and averaging frame temporal displacements in the sections in a process similar to that used in block 72 to provide fine delay $\Delta t_{2,u}$ for utterances.

Let a delay determined for a section of the split utterance be referred to as a "split" delay, $\Delta t_{3,u,s}$, where the subscript s indicates to which section "s" the split delay belongs. If the split delays $\Delta t_{3,u,s}$ are consistent with each other and with the utterance delay $\Delta t_O-\Delta t_{1,u}-\Delta t_{2,u}$ determined for the utterance for which the split delays are determined, the split delays are abandoned and no further adjustments are made to the utterance delay. If on the other hand, the split delays are not consistent with each other, and with the utterance delay, each section is assigned a delay $\Delta t_O-\Delta t_{1,u}-\Delta t_{2,u}-\Delta t_{3,u,s}$ and split again to determine split delays for the sections into which the sections are split. The split delays for the sections of the sections are tested for consistency between themselves and the previous split delays to determine whether the new split delays are to be used.

The process of splitting and determining split delays is repeatedly iterated for sections of sections of the utterance until consistent split delays are determined, at which point the process stops with an utterance in signal $YU_u(t-\Delta t_O-\Delta t_{1,u}-\Delta t_{2,u})$ split into a plurality of sections, each having its own split delay $\Delta t_{3,u,s}$. The signal including split delays is represented in a block 68 as $YU_u(t-\Delta t_O-\Delta t_{1,u}-\Delta t_{2,u}-\Delta t_{3,u,s})$. An i-th frame in signal Y(t) has a delay that is a function of an utterance, u, to which it belongs, a section, s, of the utterance in which it is located, as well as its frame index i. A frame time delay for an i-th frame in accordance with PESQ 20 may therefore be represented as a function $\Delta T_i(u,s)$.

Figure 3A:
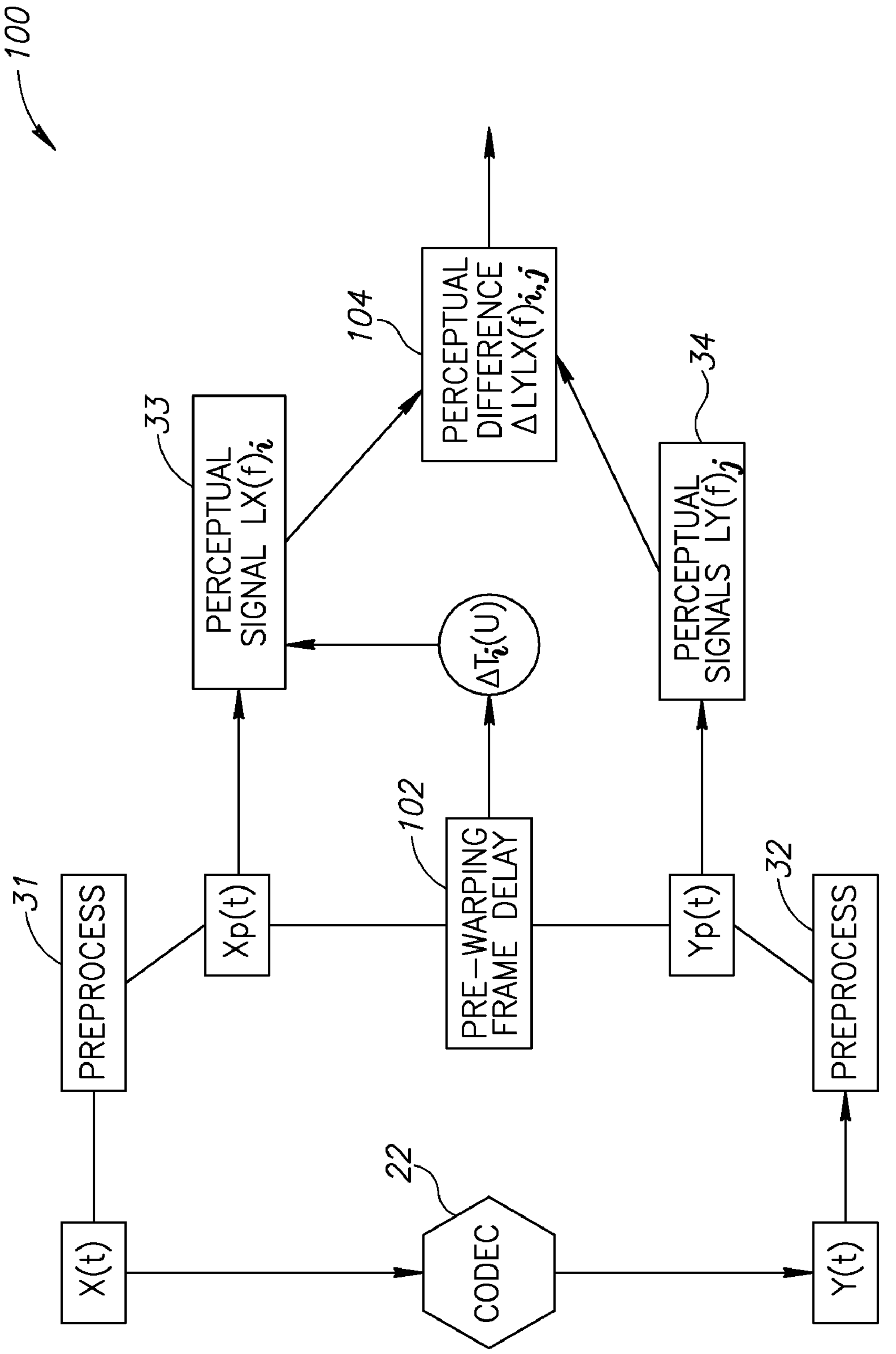
FIGS. 3A and 3B show a schematic flow diagram for determining quality of CODEC speech reproductions, in accordance with an embodiment of the invention.
Figure 3B:
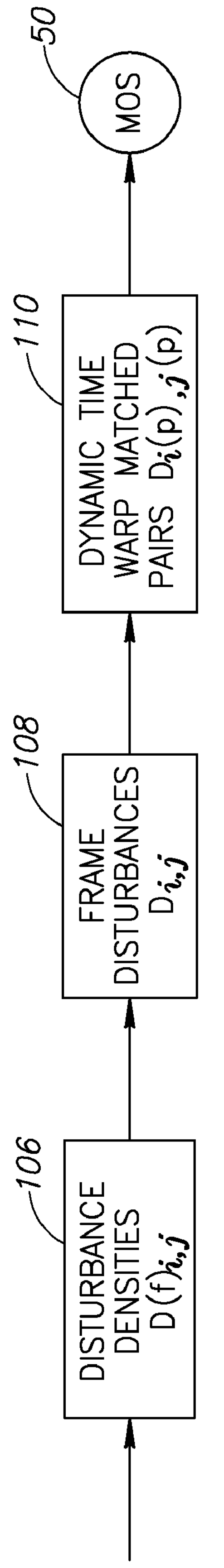

FIGS. 3A and 3B show a schematic flow diagram of a method 100 for determining quality of signal Y(t) produced by CODEC 20, in accordance with an embodiment of the invention.

As in PESQ 20, in method 100 signals X(t) and Y(t) are optionally preprocessed in blocks 31 and 32 to provided preprocessed signals $X_p(t)$ and $Y_p(t)$. The preprocessed signals are then optionally processed in blocks 33 and 34 similarly to the way the preprocessed signals are processed by PESQ 20 in FIG. 1A to provide perceptual signals $LX(f)_i$ and $LY(f)_i$ In a block 102 preprocessed signals Xp(t) and Yp(t) are, optionally, processed to identify and define utterances in the signals and produce frame delays used to align perceptual signals $LX(f)_i$ and $LY(f)_i$. However, in block 102 the frame delay is optionally different from the frame delay $\Delta T_i(u,s)$ produced by PESQ 20 in block 40 shown in FIG. 1A and described in detail with reference to FIG. 2. In an embodiment of the invention, in block 102, method 100 calculates time delays that optionally do not include split delays. Optionally, in block 102, method 100 performs the procedures indicated in block 40 of FIG. 2 up to and inclusive of the procedures indicated in blocks 72 and 66 shown in FIG. 2 to provide frame time delays $\Delta T_i(u)=\Delta t_O-\Delta t_{1,u}-\Delta t_{2,u}$ for frames i in utterances u.

Figure 4:
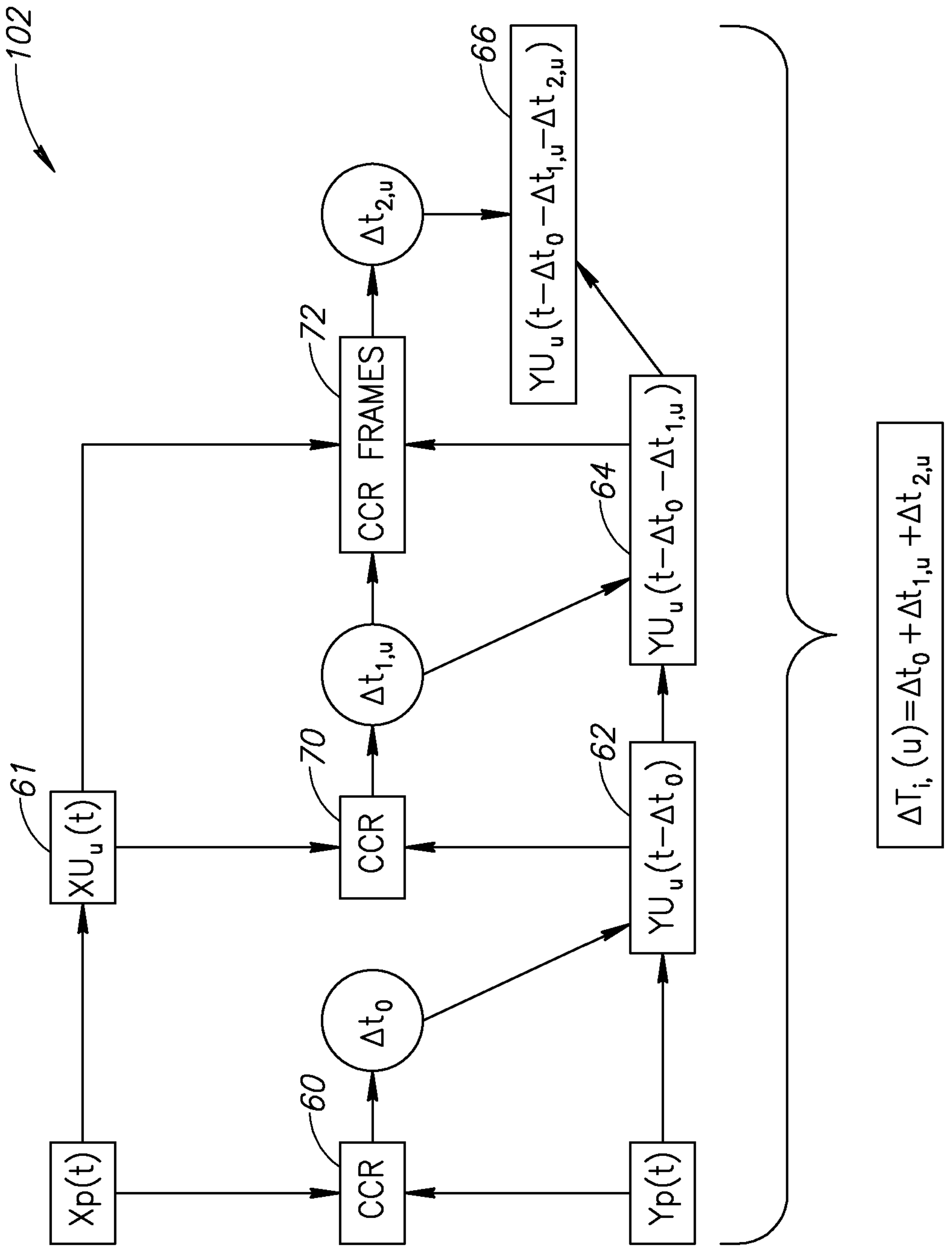
FIG. 4 shows a schematic flow diagram for determining pre-warping frame delays for use in determining quality of CODEC speech reproductions, in accordance with an embodiment of the invention.

For convenience of reference, FIG. 4 shows a schematic flow diagram of processing that is performed in block 102 of method 100. The flow diagram is labeled with the same numeral that labels 102 in FIG. 3A. Flow diagram 102 is, as is shown in FIG. 4, identical to flow diagram 40 shown in FIG. 2, up to and inclusive of block 66 and 72 in FIG. 2.

Referring again to FIG. 3A, perceptual signal $LX(f)_i$ and $LY(f)_i$ are temporally aligned using $\Delta T_i(u)$ provided by block 102 to provide perceptual differences for frames in each pair of corresponding utterances (i.e. utterances having a same utterance index u). However, it is noted that in block 42 (FIG. 1A) of PESQ 20, a single perceptual difference is determined for each frame in $LX(f)_i$ in an utterance. The single perceptual difference, $\Delta LYLX(f)_i$, is that determined for the frame in $LX(f)_i$ and its corresponding frame in $LY(f)_i$. On the other hand in block 104, in accordance with an embodiment of the invention, for each frame in perceptual signal $LX(f)_i$ a perceptual difference is determined for each of a plurality of frames in perceptual signal $LY(f)_i$. For example, let frame indices in the perceptual signal generated for signal Y(t) be represented by "j"s that the perceptual signal is represented as $LY(f)_j$. Then for each frame i of an utterance $LX(f)_i$ perceptual differences are calculated for a plurality of frames j in a corresponding utterance $LY(f)_j$. In block 104, the perceptual differences are represented as a second order tensor $\Delta LYLX(f)_{i,j}$. The plurality of perceptual differences $\Delta LYLX(f)_{i,j}$ includes the perceptual difference $\Delta LYLX(f)_{i,i}$ which corresponds to the perceptual difference $\Delta LYLX(f)_i$ of block 42 of PESQ 20.

In a block 106 in FIG. 3B the perceptual differences $\Delta LYLX(f)_{i,j}$ are used to generate disturbance densities $D(f)_{i,j}$. Optionally, $D(f)_{i,j}$ is determined from $\Delta LYLX(f)_{i,j}$ similarly to the way in which $D(f)_i$ in PESQ 20 (FIG. 1A) is determined from $\Delta LYLX(f)_i$. In a block 108, frame disturbances $D_{i,j}$ are determined from $D(f)_{i,j}$ optionally similarly to the way in which $D_i$ in PESQ 20 is determined from $D(f)_i$. $AD(f)_i$.

In a "dynamic time warp" block 110, in accordance with an embodiment of the invention, the frame disturbances $D(f)_{i,j}$ are used to temporally align frames in corresponding utterances of signals X(t) and Y(t) and determine thereby which disturbances $D_{i,j}$ are used to provide a MOS quality measure for Y(t). In an embodiment of the invention, frames are aligned in accordance with a dynamic programming algorithm. Any of various dynamic programming algorithms are known in the art and may be used in the practice of an embodiment of the invention. By way of example an article entitled "Dynamic Programming Algorithm Optimization of Spoken Word Recognition, by Hiroaki Sakoe and Seiba Chiba; IEEE Transaction on Acoustics, Speech and Signal Processing; Vol. ASSP-26, No. 1 Feb. 1978, describes a dynamic programming algorithm suitable for use in practicing an embodiment of the invention.

Figure 5:
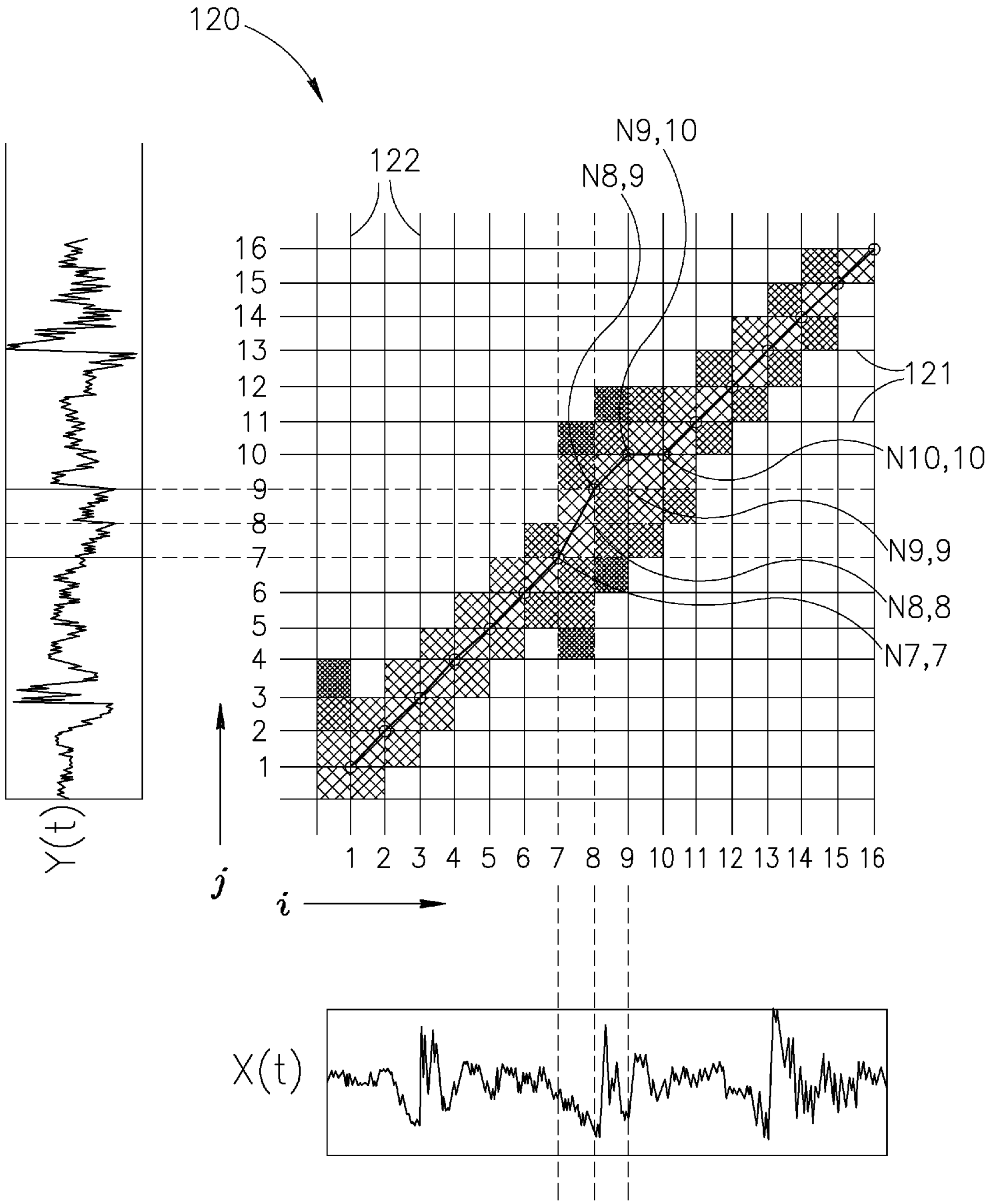
FIG. 5 shows a schematic graphic illustration for determining warped time delays in accordance with an embodiment of the invention.

FIG. 5 illustrates graphically, time aligning frames for corresponding utterances in signals X(t) and Y(t) by dynamic time warping in block 110 responsive to frame disturbances $D_{i,j}$, in accordance with an embodiment of the invention.

FIG. 5 shows a grid 120 formed by vertical lines 121 labeled with an index i that mesh with horizontal lines 122 labeled with an index j. Index i increases along a horizontal i-axis and index j increases along a vertical j-axis. The vertical lines delineate frames of an utterance of original signal X(t) whose time dependence is schematically shown below grid 120 in a direction parallel to the i-axis. Index i is assumed to have a maximum value represented by "I", by way of example equal to 16, and an i-th frame of X(t) is located between vertical lines labeled (i−1) and i (i.e. a 5-th frame of signal X(t) is located between lines labeled with i-indices 4 and 5). Similarly, horizontal lines 122 delineate fames of an utterance of reproduced signal Y(t) that corresponds to the utterance of X(t). Time development of Y(t) is shown along the j-axis with j having a maximum value "J", optionally equal to 16, and a j-th frame of Y(t) is located between vertical lines labeled j−1 and j.

A disturbance, $D_{i,j}$, between an i-th frame of X(t) and a j-th frame of Y(t) is associated with a node "$N_{i,j}$" i.e. an intersection point of the i-th vertical line with the j-th horizontal line that has coordinates (i,j) in grid 120. Magnitude of a disturbance $D_{i,j}$ at a node $N_{i,j}$ is schematically represented by density of shading of a square in the grid bounded by lines having indices i, (i−1), and j, (j−1). Denser shading indicates greater magnitude disturbance. For convenience of presentation only some of squares in grid 120 are shaded. By way of example, CODEC 22 is assumed to have malfunctioned, and instead of providing frame 9 of Y(t) with a copy of frame 9 of X(t) has reproduced frame 8 of X(t) twice, and provided frame 9 of Y(t) with the second copy of frame 8. Corresponding frames in X(t) and Y(t) that are affected by the malfunction in CODEC 22 are indicated with dashed lines.

Let a "path" that connects P nodes in grid 120 be represented by P(P) and the nodes connected by path P(P) be represented by $N_{i(p),j(p)}$, where "p" is an index that indicates a "p-th" node along path P and has a range from p=1 to p=P. A disturbance associated with a p-th node along the path is then represented by $D_{i(p),j(p)}$. Let DSUM-P(P) represent a sum of P disturbances $D_{i(p),j(p)}$ along a path P(P). In accordance with an embodiment of the invention, to align frames in Y(t) with frames in X(t), method 100 uses a dynamic programming algorithm to determine a path P(P) in grid 120 for which P is equal to the number of frames I in X(t) and DSUM-P(I) is a minimum. In symbols path P(I) is determined so that $$DSUM - \mathcal{P}(I) = \mathrm{Min}(\mathcal{P}(I))\sum_{p=1}^{p=I} D_{i(p),j(p)}. \tag{1}$$

In an embodiment of the invention, nodes $N_{i(p),j(p)}$ that define P(I) are required to satisfy constraints:

$$N_{i(p-1),j(p-1)} = \begin{cases} N_{(i(p)-1),(j(p)-1)}, \\ N_{(i(p)-1),(j(p)-2)} \text{ or} \\ N_{(i(p)-1),j(p)} \mathit{iff}\, N_{i(p-2),j(p-2)} = N_{(i(p)-2),(j(p)-1)} \text{ or } N_{(i(p)-2),(j(p)-2)} \end{cases} \tag{2}$$

Optionally, in determining P(I) the dynamic programming algorithm defines a first node of path P(I) to be $N_{1,1}$ (i.e. i(1)=j(1)=1) and therefore $D_{i(1),j(1)}=D_{1,1}$. Let DSUM-P(P,i,j) represent a sum of P disturbances $D_{i(p),j(p)}$ along a path P(P) whose last, P-th, node has indices i,j. Then additional nodes for P(I) are determined by iterating an expression:

$$DSUM - \mathcal{P}(P, i(P), j(P)) = \mathrm{Min}\begin{cases} DSUM - \mathcal{P}(P-1, i(P)-1, j(p)-1) + D_{i(P),j(p)} \\ DSUM - \mathcal{P}(P-1, i(P)-1, j(p)-2) + D_{i(P),j(p)} \\ DSUM - \mathcal{P}(P-2, i(P)-2, j(p)-1) + D_{i(P)-1,j(p)} + D_{i(P),j(p)} \\ DSUM - \mathcal{P}(P-2, i(P)-2, j(p)-2) + D_{i(P)-1,j(p)} + D_{i(P),j(p)} \end{cases} \tag{3}$$

In expression (3) "Min" requires choosing index "j(p)" for a P-th node subject to constraints of expression (2), so that the sum of disturbances over path P(P,i(P),j(P)) is a minimum.

An exemplary path determined by method 100 for X(t) and Y(t) shown in FIG. 5 in accordance with equations (1)-(3) is shown as a path P(16). Path P(16) has a slope 1 until node $N_{7,7}$ and passes through nodes $N_{1,1}$, $N_{2,2}$, $N_{3,3}$ . . . $N_{7,7}$, because until frame 8 CODEC 22 (FIG. 3A) relatively accurately reproduces each frame in X(t) to a same numbered frame in Y(t). However, as noted above, the CODEC reproduces frame 8 from X(t) twice in Y(t) and instead of filling frame 9 of Y(t) with a copy of frame 9 from X(t) erroneously provides a copy of frame 8 of X(t) for frame 9 in Y(t). As a result, disturbances $D_{8,8}$ and $D_{8,9}$ have a same relatively low value and frame 9 of X(t) is orphaned and characterized with relatively high disturbances $D_{9,8}$ and $D_{9,9}$ and by way of example a relatively low disturbance $D_{9,10}$. Between nodes $N_{7,7}$-$N_{10,10}$, method 100 "warps" path P(16) away from a straight line having slope 1 to detour the high disturbances $D_{9,8}$ and $D_{9,9}$ and minimize DSUM-P(16). As a result, frame 9 and 10 in Y(t) are "time displaced" to match and be paired with frames 8 and 9 of X(t). Thereafter, from nodes $N_{10,10}$-$N_{16,16}$ path P(16) resumes a straight, slope 1 line. Each of the remaining frames in Y(t) is matched and paired with a frame of the same number in X(t).

In some embodiments of the invention, if a disturbance $D_{i(p),j(p)}$ associated with a particular p-th, node $N_{i(p),j(p)}$ along path P(16) is larger than a predetermined threshold, frames in X(t) and Y(t) associated with at least one node in a vicinity of the particular p-th node are replaced by new frames that generate a plurality of new nodes in the vicinity of the particular p-th node that have smaller pitch than the nodes generated by the original frames. Optionally, the new frames have greater overlap than the original frames. For example, if disturbances along path 16) for given signals X(t) and Y(t) are expected to be about 20, a threshold for determining whether to subdivide frames might be 30. The frames having increased overlap define a plurality of new nodes, each having an associated disturbance and having pitch smaller than a pitch of the nodes associated with the original frames in X(t) and Y(t).

In accordance with an embodiment of the invention, a path is determined in block 110 for the new nodes for which a sum of disturbances associated with the new nodes through which the path passes is a minimum. Optionally, the path is determined similarly to the manner in which path P(16) is determined. In an embodiment of the invention, the disturbances associated with the path through the new nodes are processed to provide an alternative disturbance for the "aberrant" disturbance. Optionally, the alternative disturbance is equal to an average of the disturbances. If the alternative disturbance is less than the aberrant disturbance, the aberrant disturbance is replaced by the alternative disturbance.

The process of determining path P(16) in block 110, in accordance with an embodiment of the invention, provides a set of disturbances $\{D_{i(p),j(p)}\}$ for nodes $N_{i(p),j(p)}$ along path P(16) and the sum DSUM-P(16). It is of course noted that whereas in the above description of an embodiment of the invention, an actual path P(16) is shown and discussed, practice of the invention does not necessarily entail actual configuration of a path.

Optionally, the disturbance in the set $\{D_{i(p),j(p)}\}$ are processed in a block 50 to determine a MOS for signal Y(t). Optionally, block 50 processes $\{D_{i(p),j(p)}\}$ similarly to the way in which PESQ processes disturbances to provide a figure of merit for MOS. In some embodiments of the invention, method 100 ends at block 110 and the sum of disturbances DSUM-P(16) is used as a MOS figure of merit for Y(t).

It is noted that in the above description, method 100 comprises a block 102, illustrated in FIG. 4, in which a delay $\Delta T_i(u)$ that does not include split delays is determined, optionally, in a manner similar to determination of delay $\Delta T_i(u)$ in conventional PESQ 20. In some embodiments of the invention, not all of the steps shown in FIG. 4 are performed in determining $\Delta T_i(u)$ and $\Delta T_i(u)$ may include less than all the component time delays $\Delta t_O$, $\Delta t_{1,u}$, and $\Delta t_{2,u}$. In some embodiments of the invention, block 102 is absent, no pre-warping frame delay is determined and substantially only dynamic time warping is used to time align frames and determine disturbances used to provide a MOS figure of merit.

It is further noted that in the above description, path P(16) is determined responsive to disturbances, but not asymmetric disturbances referred to in the description of PESQ 20. However, practice of the invention is not limited to using only disturbances to determine P(16). In some embodiments of the invention, asymmetric disturbances are defined and path P(16) and a MOS figure of merit, are determined responsive to the asymmetric disturbances. For example, "composite disturbances" may be defined, which are linear combinations of a disturbances and asymmetric disturbances, and composite disturbances used in dynamic time warping to align frames.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. A method of providing a quality measure for an output voice signal generated to reproduce an input voice signal, the method comprising:

partitioning the input voice signal and the output voice signal into frames;

for each frame in the input voice signal, determining frame disturbance for a plurality of frames of the input voice signal which correspond to an utterance in the input voice signal, relative to a corresponding utterance in the output voice signal;

performing a dynamic time warp by (a) temporally aligning frames in corresponding utterances of the input voice signal and the output voice signal based on calculated frame disturbances, (b) determining which frame disturbances are to be used as a subset for calculating a MOS quality measure for the output voice signal;

wherein determining which frame disturbances are to be used, comprises:

calculating a grid having (A) a first axis representing frames of an original utterance of the input voice signal, (B) a second, perpendicular, axis representing frames of a corresponding reproduced utterance of the output voice signal, and (C) intersecting nodes in said grid representing magnitude of frame disturbance at each node;

calculating a path on said grid which provides an improved time alignment;

for at least one node of said intersecting nodes, replacing one or more frames in the input voice signal and the output voice signal with one or more new frames that generate a plurality of new nodes in a vicinity of said one node that have smaller pitch than nodes generated by original frames, wherein replacement frames have greater overlap than the original frames;

performing a dynamic time warp on each one of said plurality of new nodes; and based on the determination of which frame disturbances are to be used, calculating the MOS quality measure for the output voice signal.

2. The method according to claim 1 wherein the frame disturbances comprise asymmetric frame disturbances.

3. The method according to claim 1, comprising: limiting choices of frame disturbances for inclusion in the subset by a constraint.

4. The method according to claim 3 wherein, if a frame disturbance for an i-th frame in the input voice signal relative to a j-th frame in the output voice signal is represented by $D_{i,j(i)}$ and if $D_{i,j(i)}$ and $D_{i-1,j(i-1)}$ are included in the subset of disturbances, then requiring that the frame disturbances satisfy a constraint:

$0 \leqq [j(i)-j(i-1)] \leqq 2$.

5. The method according to claim 4 wherein, if $[j(i)-j(i-1)]=0$ then $1 \leqq [j(i)-j(i-2)] \leqq 2$.

6. The method according to claim 1, wherein, if a given frame disturbance in the subset of disturbances is greater than a predetermined threshold, then replacing (i) at least one frame in each of the input and output signals in a vicinity of the input and output frames used to determine the given disturbance with (ii) frames that define a number of new frame disturbances greater than the number determined by the at least one frame in each of the input and output signals.

7. The method according to claim 6 and comprising determining an alternative frame disturbance for the given frame disturbance responsive to the new frame disturbances.

8. The method according to claim 7 and comprising replacing the given frame disturbance with the alternative frame disturbance if the alternative frame disturbance is less than the given frame disturbance.

9. The method according to claim 7 wherein determining the alternative frame disturbance comprises using a dynamic programming algorithm.

10. The method according to claim 1 and comprising temporally aligning frames in the output voice signal with frames in the input voice signal responsive to a correlation of energy envelopes of the input and output voice signals.

11. The method according to claim 1 wherein determining the subset of frame disturbances comprises using a dynamic programming algorithm.

12. The method of claim 1, comprising:

generating a perceptual input signal based on a first density function corresponding to the input voice signal;

generating a perceptual output signal based on a second density function corresponding to the output voice signal;

for each frame in the perceptual input signal, determining a perceptual difference for a plurality of frames of the perceptual input signal which correspond to an utterance in the perceptual input signal, relative to a corresponding utterance in the perceptual output signal.

13. The method of claim 1, wherein calculating a path comprises:

calculating the path such that the path length is equal to a length of frames in the original utterance.

14. The method of claim 1, wherein calculating a path comprises:

calculating the path such that the path length is equal to a length of frames in the reproduced utterance.

15. The method of claim 1, wherein replacing the one or more frames is performed if frame disturbance at a particular node along said path is greater than a predefined threshold.

16. The method of claim 1, wherein the calculating comprises:

calculating a path on said grid, for which the sum of frame disturbances of the nodes of said path is a minimum.

17. An apparatus for testing quality of speech provided by an audio processing unit of said apparatus, the apparatus comprising:

a first input port for receiving an input audio signal received by the audio processing unit;

a second input port for receiving an output audio signal provided by the audio processing unit responsive to the input audio signal; and a processor configured to process the input audio signal and the output audio signal in accordance with the method of claim 1 to provide a measure of quality of the output audio signal.

18. A non-transitory computer readable storage medium containing a set of instructions for testing quality of an output voice signal provided by a CODEC responsive to an input voice signal, the instructions comprising instructions for performing the method of claim 1.

* * * * *